United States Patent
Maezawa et al.

(10) Patent No.: US 10,412,551 B2
(45) Date of Patent: Sep. 10, 2019

(54) CROWD CONDITION ESTIMATION SYSTEM, CROWD CONDITION ESTIMATION METHOD AND RECORDING MEDIUM

(71) Applicant: Recruit Co., Ltd., Tokyo (JP)

(72) Inventors: Ryuichiro Maezawa, Tokyo (JP); Kazunori Okubo, Tokyo (JP)

(73) Assignee: Recruit Co., Ltd., Chuo-ku Tokyo (JP)

( * ) Notice: Subject to any disclaimer, the term of this patent is extended or adjusted under 35 U.S.C. 154(b) by 0 days.

(21) Appl. No.: 15/742,957

(22) PCT Filed: Jul. 7, 2016

(86) PCT No.: PCT/JP2016/070125
§ 371 (c)(1),
(2) Date: Jan. 9, 2018

(87) PCT Pub. No.: WO2017/006992
PCT Pub. Date: Jan. 12, 2017

(65) Prior Publication Data
US 2018/0376289 A1    Dec. 27, 2018

(30) Foreign Application Priority Data

Jul. 9, 2015 (JP) .................................. 2015-137481

(51) Int. Cl.
*H04W 4/029* (2018.01)
*H04W 24/00* (2009.01)
(Continued)

(52) U.S. Cl.
CPC ........... *H04W 4/029* (2018.02); *H04W 24/00* (2013.01); *H04W 24/08* (2013.01); *H04W 74/08* (2013.01); *H04W 84/12* (2013.01); *H04W 88/02* (2013.01)

(58) Field of Classification Search
CPC combination set(s) only.
See application file for complete search history.

(56) References Cited

U.S. PATENT DOCUMENTS

2015/0089424 A1* 3/2015 Duffield ................. G06Q 10/00
                                                                    715/771
2015/0215797 A1* 7/2015 Yoshimi ................. H04W 4/04
                                                                    370/252

FOREIGN PATENT DOCUMENTS

GB        2416645       2/2006
JP    2001-325300      11/2001
(Continued)

OTHER PUBLICATIONS

Nakano et al, "Congestion Level Estimation in a Train Using Scan Request to Wireless LAN Access Point", Proceedings of the 4th Forum on Data Engineering and Information Management, Aug. 30, 2012, 5 pages, Englsh Abstract on p. 1 of the reference, (Partial English Translation attached).
(Continued)

*Primary Examiner* — Said M Elnoubi
(74) *Attorney, Agent, or Firm* — Morgan, Lewis & Bockius, LLP

(57) ABSTRACT

Based on an idea that there is a correlation between the number of mobile terminals 300 detected inside a facility (that is, a detected terminal count) and visitors of the facility, the number of users using the facility (that is, a crowd condition of the facility) is estimated using a WiFi function provided in the mobile terminals 300. Consequently, the crowd condition of the facility can simply be estimated while costs are suppressed to be low, compared to conventional methods in which, e.g., infrared modules or Web cameras are provided at entrances/exits of a facility to estimate a crowd condition.

7 Claims, 7 Drawing Sheets

(51) Int. Cl.
*H04W 74/08* (2009.01)
*H04W 84/12* (2009.01)
*H04W 88/02* (2009.01)
*H04W 24/08* (2009.01)

(56) References Cited

FOREIGN PATENT DOCUMENTS

JP        2002-083025      3/2002
WO       2014/034707      3/2014

OTHER PUBLICATIONS

Nakano et al., "In-Door Congestion Level Estimation Using Probe Request to Wireless LAN Access Point", Tge 5th Forum on Data Engineering and Information Management, Jun. 5, 2013, 8 pages, Englsh Abstract on p. 1 of the reference, (Partial English Translation attached).
Mochizuki, "Construction of Pedestrian Flow Analysis in a State of being Anonymous using Wi-Fi Packet Sensor", Information Processing Society of Japan, Technical Report, Mar. 7, 2014, 113(495), 10 pages (Partial English Translation attached).
International Patent Application No. PCT/JP2016/070125, International Search Report, dated Sep. 27, 2016, 2 pages.
International Patent Application No. PCT/JP2016/070125, Written Opinion of the International Searching Authority, dated Sep. 27, 2016, 7 pages.

* cited by examiner

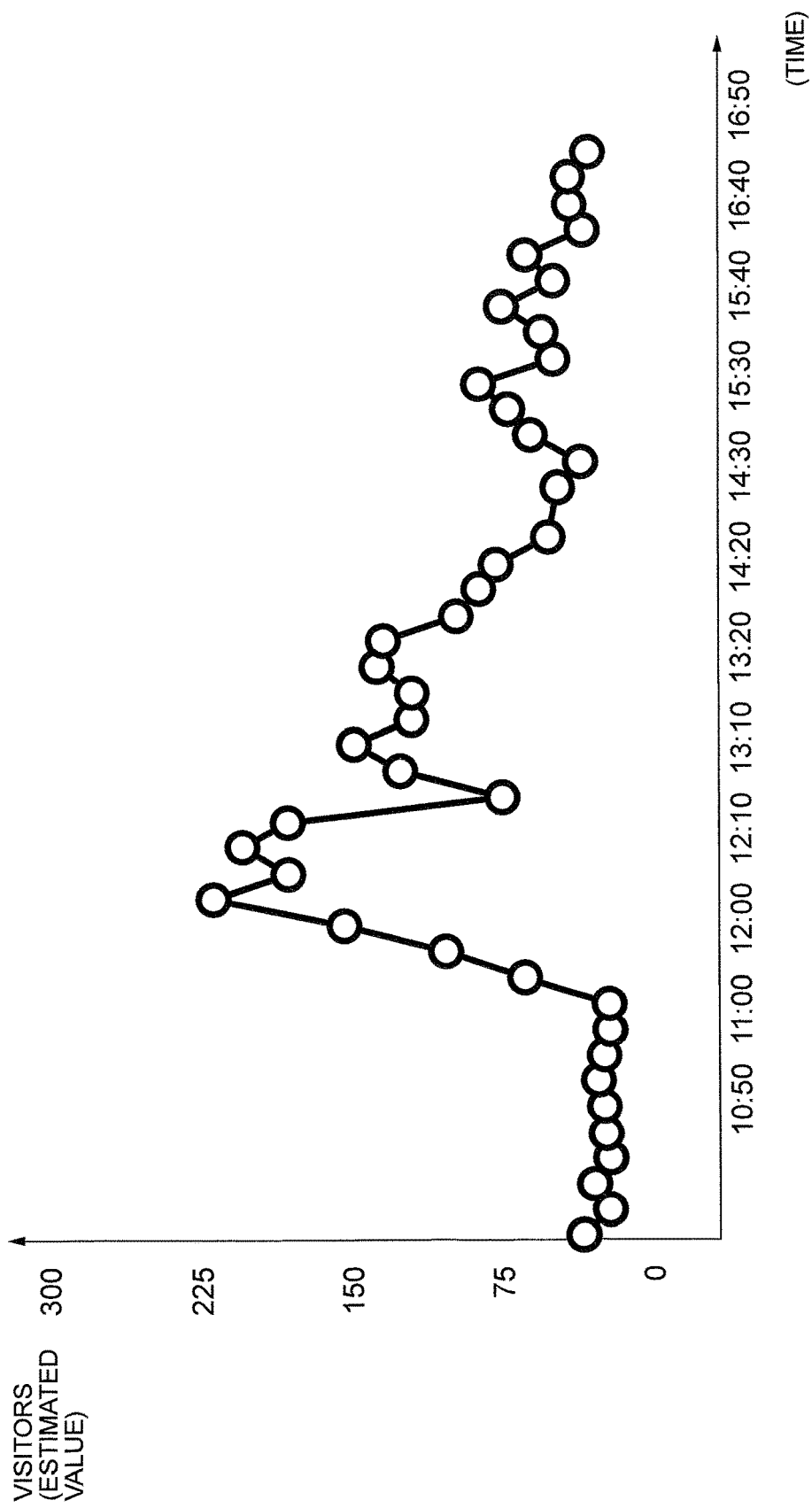

CROWD CONDITION ESTIMATION SYSTEM, CROWD CONDITION ESTIMATION METHOD AND RECORDING MEDIUM

CROSS-REFERENCE TO RELATED APPLICATIONS

This application is a U.S. National Phase Application under 35 U.S.C. 371 of International Application No. PCT/JP2016/070125 filed Jul. 7, 2016, which claims priority to Japanese Patent Application No. 2015-137481 filed Jul. 9, 2015, all of which are incorporated herein by reference in their entireties.

TECHNICAL FIELD

The present invention relates to a technique of estimating a crowd condition in a facility such as a restaurant.

BACKGROUND ART

In recent years, infrared modules and Web cameras are used as methods for grasping crowd conditions of facilities. For example, in a facility such as a restaurant, infrared modules are installed at entrances/exits and, e.g., the number of times of blocking of infrared light is counted to estimate the number of people staying in the facility, or a plurality of Web cameras are installed at entrances/exits, moving or still images taken by the cameras are analyzed to estimate the number of people staying in the facility (see, for example, Patent Literature 1 indicated below).

CITATION LIST

Patent Literature

Patent Literature 1: Japanese Patent Laid-Open No. 2002-83025

SUMMARY OF INVENTION

Technical Problem

However, such methods using devices such as infrared modules or Web cameras need a number of devices corresponding to the number of entrances/exits, which causes a problem of necessity for a large amount of equipment investment.
Furthermore, the method in which a crowd condition is estimated using a plurality of Web cameras has a problem in that if a plurality of persons overlap in an image, identification of the respective persons is technically difficult.
In addition, from the viewpoint of individual privacy, shooting itself is often unwelcome and the method using Web cameras thus has a problem of difficulty in implementation.
The present invention has been made in view of the circumstances explained above, and an object of the present invention is to provide a technique capable of simple estimation of a crowd condition of a facility with costs suppressed to be low. Another object of the present invention will be clarified by referring to the entire present description.

Solution to Problem

A crowd condition grasping system according to an aspect of the present invention is a crowd condition estimation system for estimating a crowd condition of a facility, the system including: a detection section that detects a probe request transmitted from a mobile terminal, the probe request relating to wireless communication; a counting section that counts a number of pieces of terminal identification information included in the probe requests detected within a set length of time; a storage section that stores an estimation algorithm for estimating a number of users of a facility; an estimation section that estimates a number of users using the facility based on the counted number of pieces of terminal identification information and the estimation algorithm; and an output section that outputs the estimated number of users using the facility.

Here, in the above configuration, it is preferable that the probe request includes radio field strength information indicating a radio field strength and the detection section detects the probe request if the radio field strength of the probe request, the radio field strength being indicated in the radio field strength information, exceeds a radio field strength threshold value.

Also, in the above configuration, it is possible that the estimation section estimates the number of users using the facility, based on a parameter that is at least either of a parameter relating to a style of the facility and a parameter relating to an ambient environment of the facility, the counted number of pieces of terminal identification information and the estimation algorithm. Note that the above-stated system is one aspect of the present invention, and a system according to the present invention may be an arbitrary combination of the above-stated components. Also, an apparatus, a method, a computer program, a recording medium, etc., according to the present invention each have a configuration that is similar to the above.

Advantageous Effects of Invention

The present invention enables simple estimation of a crowd condition of a facility with costs suppressed to be low.

BRIEF DESCRIPTION OF DRAWINGS

FIG. 7 is a diagram illustrating an example of changes in (estimated) number of users in a facility.

DESCRIPTION OF EMBODIMENTS

Figure 1:
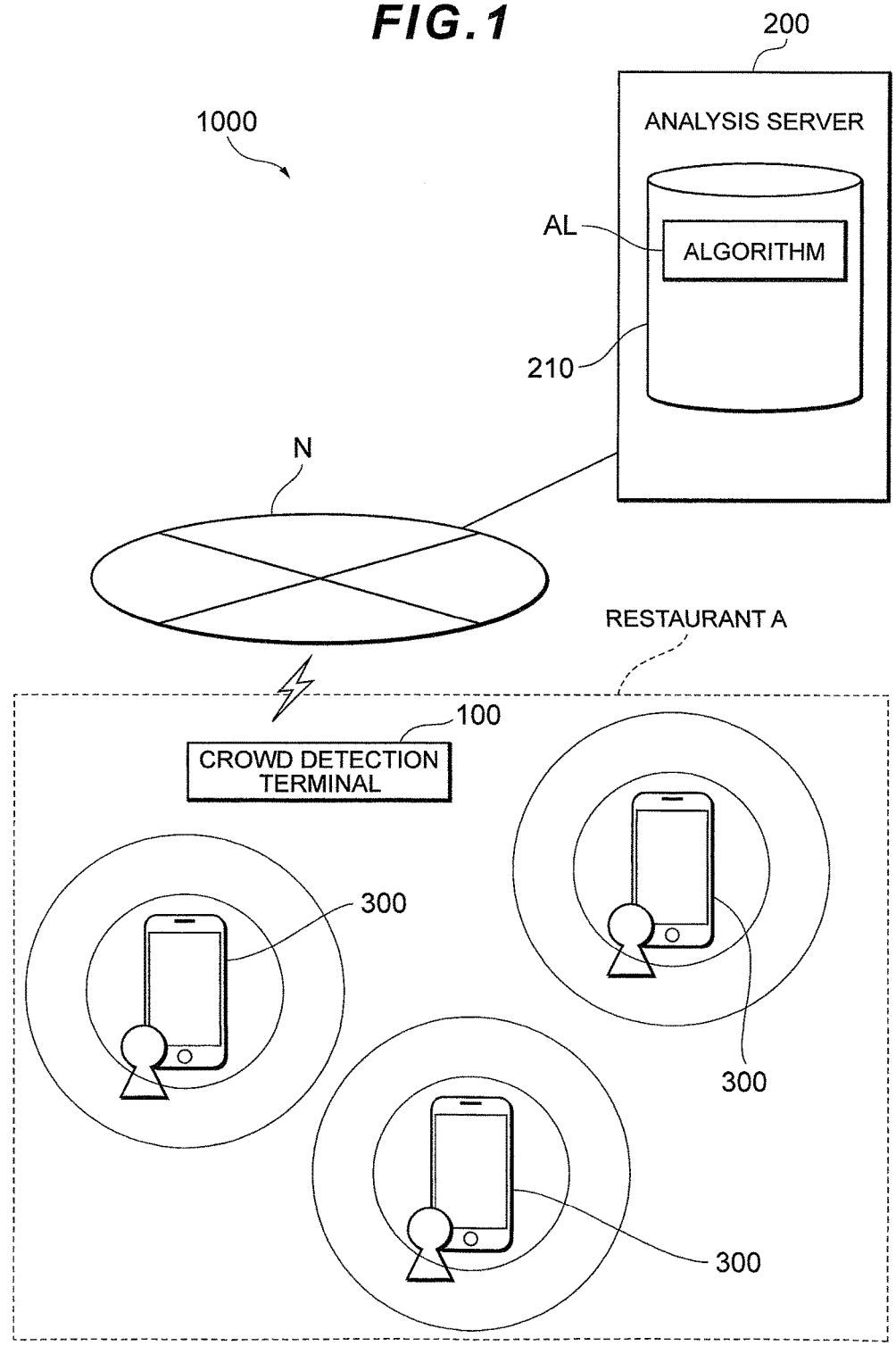
FIG. 1 is a diagram illustrating a schematic configuration of a crowd condition estimation system 1000 according to the present embodiment.

An embodiment of the present invention will be described in detail below with reference to the drawings. Note that same elements are provided with a same reference numeral and overlapping description thereof will be omitted.

A. Present Embodiment

FIG. 1 is a schematic configuration of a crowd condition estimation system 1000 according to the present embodiment. As illustrated in the figure, the crowd condition estimation system 1000 includes a crowd detection terminal 100 installed in each facility, and an analysis server 200 connected to the crowd detection terminal 100 via a communication network N.

In the present embodiment, the crowd detection terminal 100 detects the number of mobile terminals 300 each having a WiFi (Wireless Fidelity) standard-based wireless LAN function (WiFi function), and the analysis server 200 analyzes a result of the detection and estimates a crowd condition of the relevant facility. In the below description, for sake of convenience, a case where a crowd detection terminal 100 is installed at restaurant A (facility) providing food/drink service to estimate a crowd condition of restaurant A is taken as an example, which, however, is not intended to limit the present invention to this example, and the present invention is applicable to estimation of a crowd condition of any sort of facilities including, e.g., shops such as complex amusement systems, shopping malls, department stores, hospitals and public facilities and various types of stadiums.

The crowd detection terminal 100 is a terminal apparatus for detecting mobile terminals 300 carried by users visiting the facility (visitors), and is installed, for example, inside the facility (or near the facility). The crowd detection terminal 100 includes, e.g., a compact PC (personal computer), a WiFi module, a power supply and an external storage device (an SD card or a USB memory) (the details will be described later).

Each mobile terminal 300 is a terminal carried by a visitor, and has a WiFi function for wireless communication via, e.g., a non-illustrated access point (AP). In the present embodiment, it is assumed that the mobile terminals 300 are smartphones, but the mobile terminals 300 may be any sort of terminals having the WiFi function such as mobile phones, PHSs, personal computers (PC), laptop PCs, mobile information terminals (PDA) and home video game consoles.

The analysis server 200 is configured by, for example, a computer with high arithmetic processing performance, and a server function is provided by operation of a predetermined server program in the computer. The analysis server 200 includes a database 210. In the database 210, an analysis algorithm AL required to analyze crowd detection information transmitted from the crowd detection terminal 100 and estimate the number of users using the facility is stored (the details will be described later). Here, it is not necessarily required that the analysis server 200 be configured by a single computer, and the analysis server 200 may be configured by a plurality of computers disposed on the communication network N.

The communication network N includes a communication network that enables mutual transmission/reception of information between the analysis server 200 and the crowd detection terminal 100. The communication network N may be, for example, any of the Internet, an LAN, a dedicated line, a phone line, an intranet, a mobile communication network, Bluetooth, WiFi and other communication media and any combination thereof, and may be either wired or wireless.

<Crowd Detection Terminal 100>

Figure 2:
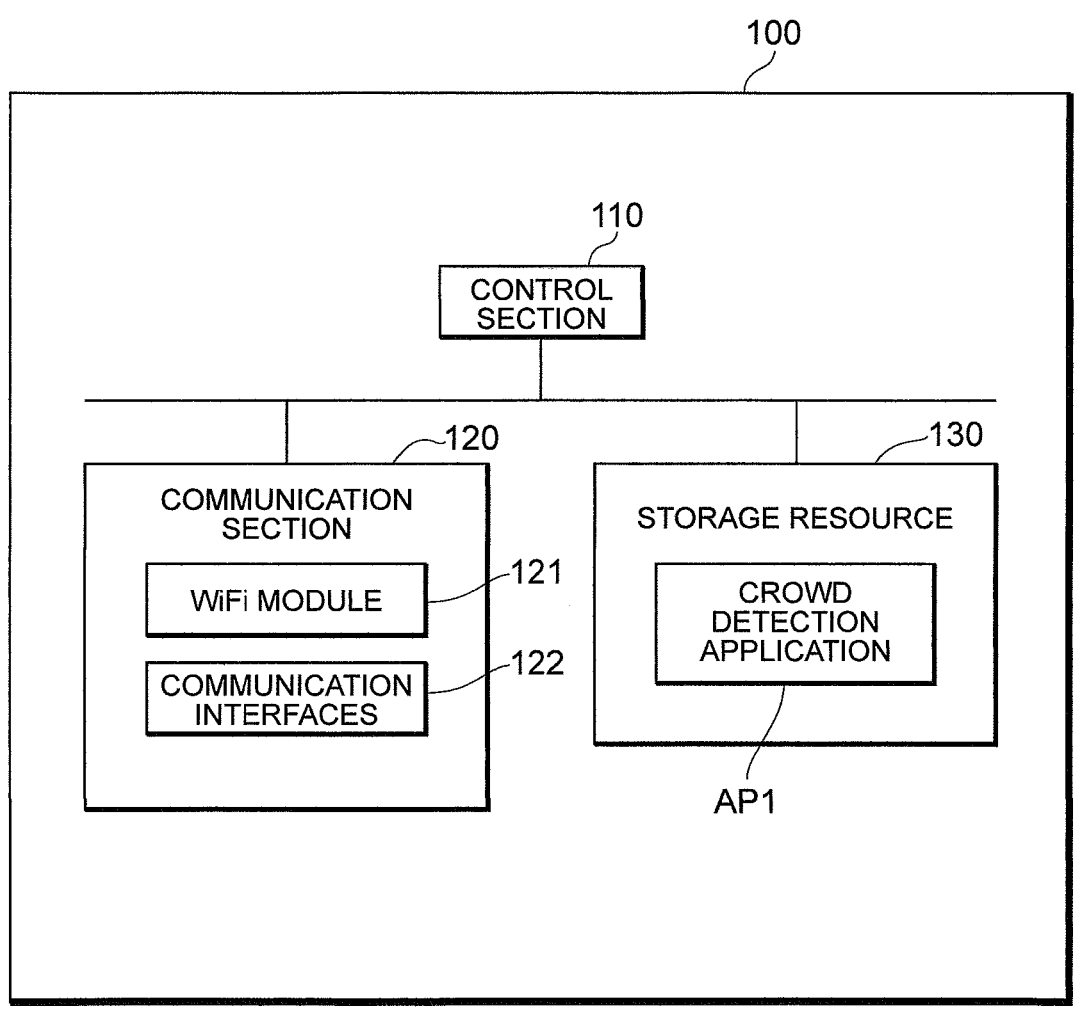
FIG. 2 is a block diagram illustrating a major configuration of a crowd detection terminal 100.

FIG. 2 is a block diagram illustrating a functional configuration of a crowd detection terminal 100. The crowd detection terminal 100 includes a control section 110, a communication section 120 and a storage resource 130.

The control section 110 includes, e.g., an arithmetic logic unit that performs processing for an arithmetic operation, a logical operation, a bit operation, etc. (e.g., a CPU) and various types of registers, and centrally controls the respective sections of the crowd detection terminal 100 by execution of various programs stored in the storage resource 130. Examples of various registers include, e.g., a program counter, a data register, an instruction register and a general-purpose register.

The communication section 120 includes, in addition to a WiFi module 121, various communication interfaces 122 for communication with other terminals on the communication network N. Each communication interface 122 is, for example, a modulation/demodulation apparatus such as an ISDN modem, an ADSL modem, a cable modem, an optical modem or a software modem.

The storage resource 130 is configured by, for example, a computer-readable recording medium such as a disk drive or a semiconductor memory (e.g., a ROM or a RAM) or an external storage device (an SD card or a USB memory). The storage resource 130 may be built by mapping a plurality of physical devices on one logical device or may be built by mapping one physical device on a plurality of logical devices.

In the storage resource 130, e.g., an operation system program, a driver program and various types of data are stored. Examples of the driver program include, e.g., a communication interface driver program for controlling a communication interface 122. Also, in the storage resource 130, a computer program (hereinafter, "crowd detection application") AP1 for detecting a probe request periodically broadcasted by each mobile terminal 300 is stored. The crowd detection terminal 100 periodically performs probe request detection, and transmits a result of the detection to the analysis server 200 as crowd detection information (the details will be described later).

<Analysis Server 200>

The analysis server 200 analyzes the crowd detection information transmitted from the crowd detection terminal 100 to estimate the number of users using the facility.

Figure 3:
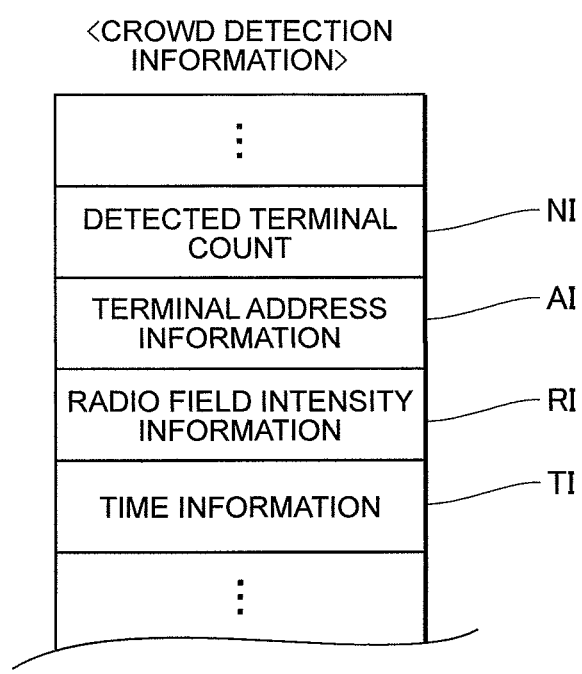
FIG. 3 is a diagram illustrating an example of crowd detection information.

FIG. 3 is a diagram illustrating an example of a configuration of the crowd detection information. As illustrated in FIG. 3, in the crowd detection information, in addition to a mobile terminal 300 count (hereinafter, "detected terminal count) NI detected by the crowd detection terminal 100, e.g., information such as a MAC address (hereinafter, "terminal address information") AI, information indicating a radio field strength (hereinafter, "radio field strength information") RI, information representing a time of the detection (hereinafter, "time information") TI are included for each of the detected mobile terminals 300. The analysis server 200 applies the analysis algorithm AL stored in the database 210 to the crowd detection information to estimate the number of users using the facility. For example, a method such as, e.g., performing an arithmetic operation with the detected terminal count NI and the radio field strength information RI assigned to a predetermined function to obtain the number of users using the facility may be employed. However, this example is not intended to limit the present invention thereto, and it is possible that a parameter relating to a style of the facility (e.g., service provided by the facility, a structure of the facility or a material of the facility (wooden construction or reinforced construction)) and/or a parameter relating to an ambient environment of the facility (e.g., information relating to a season, a day, an air temperature or weather) are acquired (input) and the number of users using the facility are estimated using these parameters, the crowd detection information and the analysis algorithm AL. Other examples of the style of the facility may include, e.g., area information representing the area of the facility, shape information representing a shape of the facility and age information representing the age. Furthermore, other examples of the ambient environment of the facility may include, e.g., site location information representing a site location of the facility (for example, the facility is built on a shopping street) and event information (e.g., a festival) for an ambient area including the facility. Also, examples of a method for input of the parameters include, e.g., an owner of the facility performing the input using, e.g., his/her own personal computer; however, what method to be employed can arbitrarily be changed according to, e.g., the system design. Also, it is possible that a plurality of analysis algorithms AL are provided in advance according to, e.g., the types and/or values of the parameters to select an optimum analysis algorithm AL. After estimation of the number of users using the facility in such a manner as described above, the analysis server 200 transmits the result of the estimation to a predetermined terminal (for example, a terminal including a display panel) as information on the estimation of the number of users using the facility, in response to a request from, e.g., the facility.

Operation where the number of users using the facility (crowd condition) is estimated using the crowd detection terminal 100 installed at restaurant A will be described below.

<Crowd Detection Processing>

Figure 4:
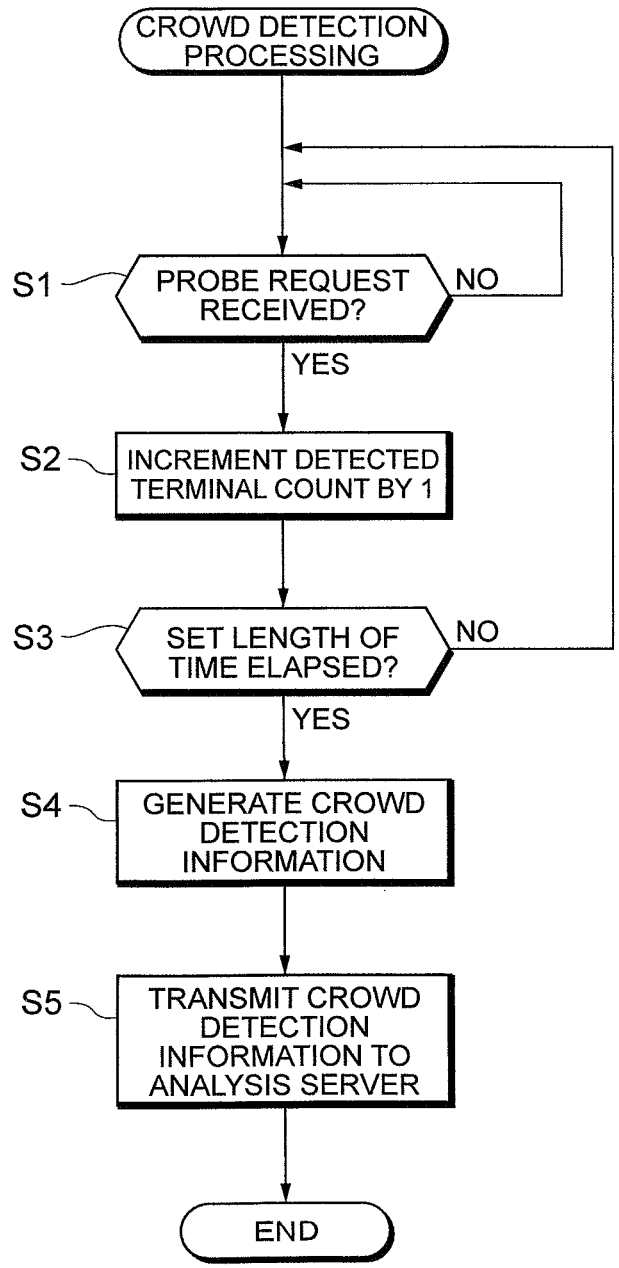
FIG. 4 is a flowchart illustrating crowd detection processing.

FIG. 4 is a flowchart illustrating crowd detection processing executed by the crowd detection terminal 100. The mobile terminals 300 having the WiFi function each periodically broadcast a probe request in order to search for a connectable access point. The crowd detection terminal 100 installed inside the facility repeatedly performs the processing in step S1 until reception of a probe request from a mobile terminal 300. Upon reception of a probe request from a mobile terminal 300 (step S1: YES), the crowd detection terminal (detection unit, counting section) 100 acquires a MAC address, a time stamp and a radio field strength included in the probe request, which are unique, and then increments the number of MAC addresses (detected terminal count) by "1" (step S2). Then, the crowd detection terminal 100 determines whether or not a set length of time (for example, ten minutes) has elapsed from the start of the processing, with reference to, e.g., a timer (illustration omitted) (step S3). If the crowd detection terminal 100 determines that the set length of time has not elapsed (step S3: NO), the crowd detection terminal 100 returns to step S1 and repeatedly performs the above-described processing series. On the other hand, if the crowd detection terminal 100 determines that the set length of time has elapsed (step S3: YES), the crowd detection terminal 100 generates crowd detection information including the number of mobile terminals 300 detected within the set length of time (that is, a detected terminal count) NI, and terminal address information AI, radio field strength information RI and time information TI for each of the detected mobile terminals 300 (step S4: see FIG. 3), and transmits the crowd detection information to the analysis server 200 (step S5), and ends the processing.

<Facility User Count Estimation Processing>

Figure 5:
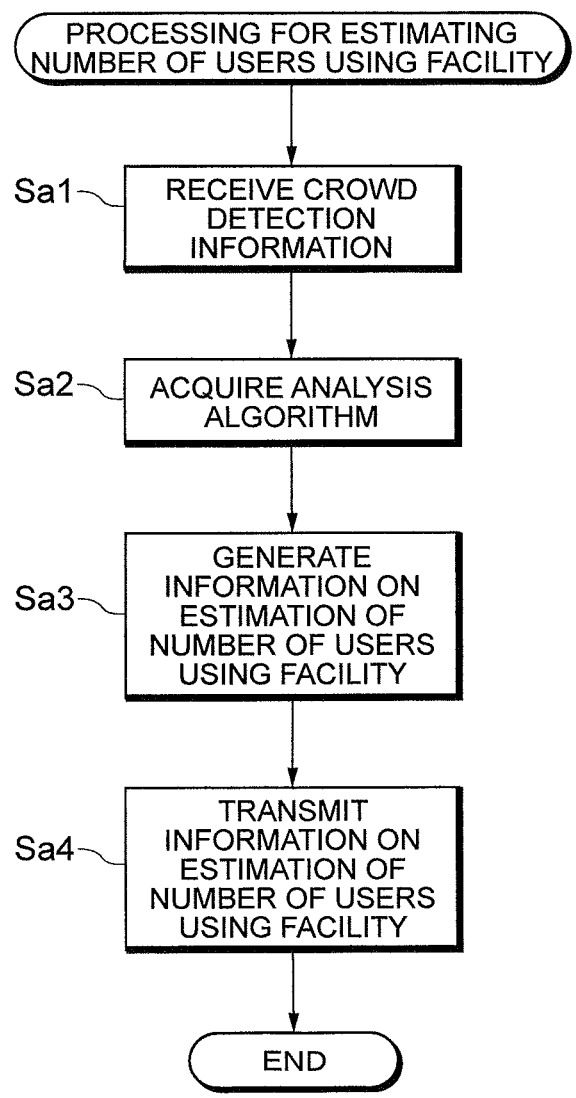
FIG. 5 is a flowchart illustrating processing for estimation of the number of users using a facility.

FIG. 5 is a flowchart of processing for estimation of the number of users using the facility, the processing being performed by the analysis server 200.

Upon reception of the crowd detection information from the crowd detection terminal 100 via the communication network N (step Sa1), the analysis server 200 acquires the analysis algorithm AL from the database (storage section) 210 (step Sa2). The analysis server (estimation section) 200 applies the acquired analysis algorithm AL to the received crowd detection information to estimate the number of users using the facility and generates information on the estimation of the number of users using the facility (step Sa3). Here, as already described, the number of users using the facility can be estimated in consideration of not only the crowd detection information, but also a parameter relating to a style of the facility and/or a parameter relating to an ambient environment of the facility. Then, the analysis server (output section) 200 transmits the information on the estimation of the number of users using the facility, in response to a request from, e.g., the facility (step Sa4), and ends the processing.

As described above, according to the present embodiment, based on an idea that there is a correlation between the number of mobile terminals 300 detected inside the facility (that is, the detected terminal count) and visitors of the facility, the number of users using the facility (that is, the crowd condition of the facility) is estimated using the WiFi function provided in the mobile terminals 300.

Consequently, simple estimation of the crowd condition of the facility is enabled with the costs suppressed to be low compared to the conventional methods in which infrared modules or Web cameras or the like are provided at entrances/exits of a facility to estimate a crowd condition.

B. Others

The present invention is not limited to the above-described embodiment and can be carried out in various other modes without departing from the spirit of the present invention. Therefore, the above-described embodiment is a mere exemplification in all respects and is not interpreted in a limited manner. For example, the order of the above-described processing steps can arbitrarily be changed or the processing steps can be performed in parallel as long as no contradiction occurs in the content of the processing.

Although in the above-described embodiment, there is no reference to radio field strengths of probe requests to be detected, for example, it is possible that a radio field strength threshold value (e.g., no less than −65 dB) may be provided to exclude a probe request having a radio field strength equal to or below the radio field strength threshold value from the probe requests to be detected. In this way, probe requests having a radio field strength equal to or below the radio field strength threshold value are regarded as those from mobile terminals 300 outside the facility and excluded from the probe requests to be detected, enabling enhancement in accuracy of estimation of the crowd condition of the facility. For the radio field strength threshold value, an optimum value may be determined by, for example, conducting a test in advance.

Figure 6:
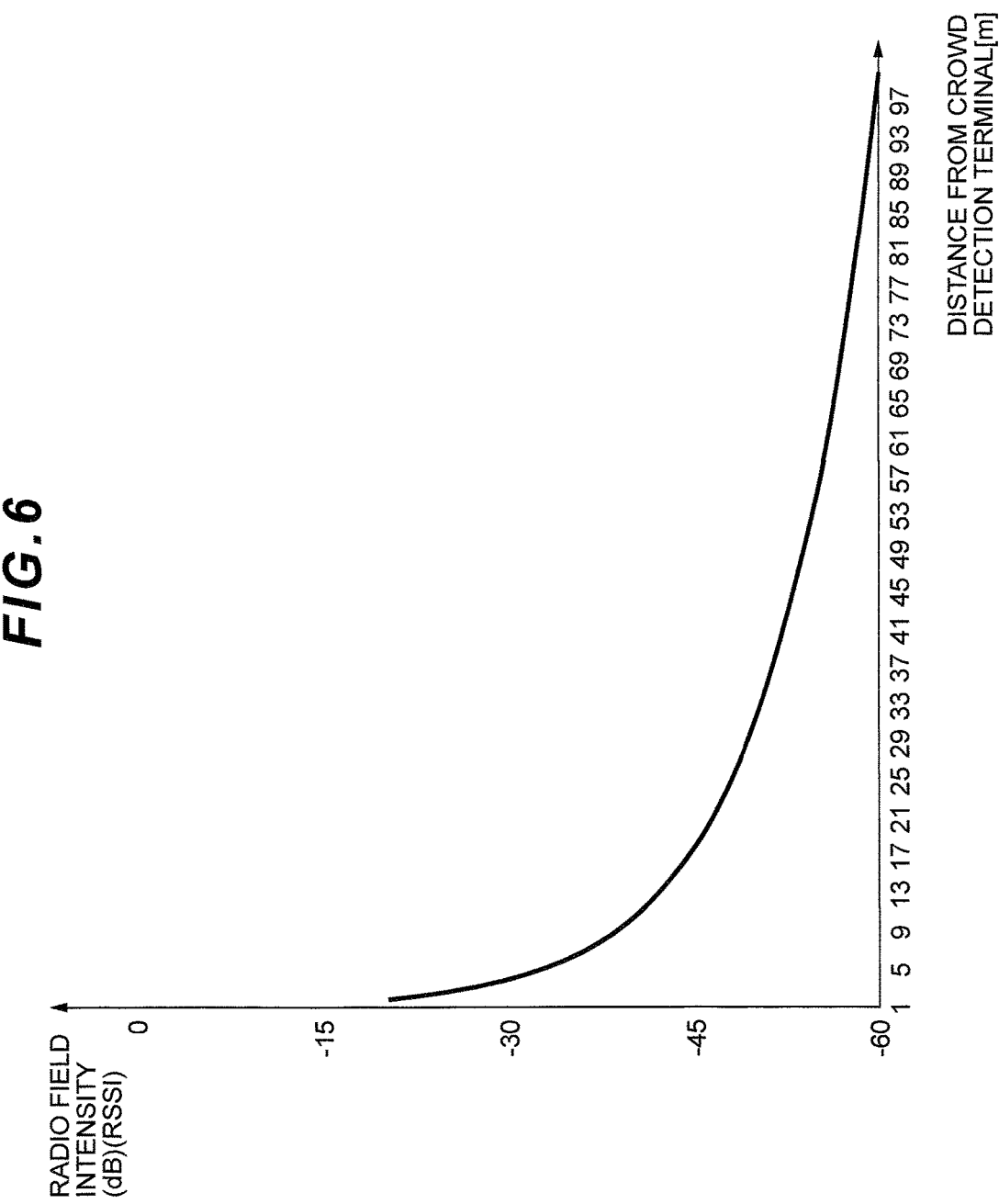
FIG. 6 is a diagram indicating a relationship between a radio field strength and a distance.

Also, although in the above-described embodiment, there is no specific reference to a position at which the crowd detection terminal 100 is installed, for example, a recommended position of installation may be determined in advance according to, e.g., the shape of the facility. For example, in consideration of a relationship between a radio field strength and a distance from a crowd detection terminal 100 (the radio field strength decreases inversely with the square of the distance), which is indicated in FIG. 6, for example, installation of a crowd detection terminal 100 at a center of a facility, rather than an entrance/exit of the facility, may be recommended. As a matter of course, if a floor plan of the facility is known in advance, a recommended position of installation of a crowd detection terminal 100 may be determined based on the floor plan of the facility.

Also, how information on estimation of the number of users using a facility, which is generated at a predetermined timing (for example, ten-minute interval), is utilized can arbitrarily be changed according to, e.g., an intension of an owner of the facility. For example, it is possible that a graph indicating changes in (estimated) number of users (change graph) is created based on the information on estimation of the number of users using the facility and the graph is displayed on a display monitor inside the facility (see FIG. 7) or the change graph is displayed on, e.g., a website of the facility.

Also, the analysis algorithm AL described in the database 210 may arbitrarily be modified based on, e.g., a demonstration test. More specifically, for each of particular sample facilities, e.g., a Web camera is installed inside the shop, and the number of users using the facility is counted at a predetermined timing (correct value). On the other hand, a crowd detection terminal 100 is installed at any of the particular facilities, and the number of users using the facility is estimated in such a manner as described above (estimated value). Then, the estimated value and the correct value of the number of users using the facility are compared with each other, and, e.g., parameters of the analysis algorithm AL is arbitrarily changed so as to correct the difference therebetween, enabling more accurate estimation of the number of users using the facility.

Furthermore, not only use of a single crowd detection terminal 100, but also use of a plurality of crowd detection terminals 100 is possible for estimation of a crowd condition of a facility. For example, where an extensive facility (e.g., an athletic field) is an estimation target, use of a plurality of crowd detection terminals 100 enables more accurate crowd condition estimation. Although in the present embodiment, WiFi standard compliant wireless communication has been indicated as an example, the present invention may be applied to a wireless communication that is compliant with any of other standards.

Also, although in the above embodiment has been described in terms of a system in which a crowd detection terminal 100 and an analysis server 200 cooperatively estimate a crowd condition of a facility, the configuration of the system is not limited to that of this system, and any of various configurations can be employed. For example, the functions of the analysis server 200 are provided on the crowd detection terminal 100 side, enabling an apparatus that is equivalent in function to the crowd condition estimation system 1000 to be configured by a crowd detection terminal 100 alone.

A program for providing each of the above-described embodiments of the present invention may be stored in a recording medium. Use of the recording medium enables installation of the program in a computer for managing a waiting list for a facility. Here, the recording medium with the program recorded therein may be a non-transitory recording medium. The non-transitory recording medium is not specifically limited and may be, for example, a recording medium such as a CD-ROM.

REFERENCE SIGNS LIST

1000 . . . crowd condition estimation system
100 . . . crowd detection terminal
200 . . . analysis server
300 . . . mobile terminal
AL . . . analysis algorithm
NI . . . detection terminal count
AI . . . terminal address information
RI . . . radio field strength information
TI . . . time information
N . . . communication network
110 . . . control section
120 . . . communication section
121 . . . WiFi module
122 . . . communication interface
130 . . . storage resource
AP1 . . . crowd detection application

What is claimed is:

1. A crowd condition estimation system for estimating a crowd condition of a facility, the system configured to perform the steps of:
   detecting a probe request transmitted from a mobile terminal, the probe request relating to wireless communication;
   counting a number of pieces of terminal identification information included in the probe requests detected within a set length of time;
   storing an estimation algorithm for estimating a number of users of a facility;
   estimating a number of users using the facility based on the counted number of pieces of terminal identification information and the estimation algorithm; and
   outputting the estimated number of users using the facility,
   wherein estimating the number of users using the facility is based on a parameter that is at least a parameter relating to a style of the facility, the counted number of pieces of terminal identification information, and the estimation algorithm.

2. The crowd condition estimation system according to claim 1, wherein:
   the probe request includes radio field strength information indicating a radio field strength; and
   the system is further configured to perform the steps of detecting the probe request if the radio field strength of the probe request, the radio field strength being indicated in the radio field strength information, exceeds a radio field strength threshold value.

3. The crowd condition estimation system according to claim 1, wherein estimating the number of users using the facility is based on a parameter that is at least a parameter relating to an ambient environment of the facility.

4. The crowd condition estimation system according to claim 3, wherein the system includes:
   a terminal apparatus configured to perform the steps of:
      detecting the probe request transmitted from the mobile terminal;
      counting the number of pieces of terminal identification information included in the probe requests detected within the set length of time, and
   an analysis server, connectable with the terminal apparatus via a communication network, configured to perform the steps of:
      storing the estimation algorithm for estimating the number of users of the facility;
      estimating the number of users using the facility based on the counted number of pieces of terminal identification information and the estimation algorithm; and
      outputting the estimated number of users using the facility, and displaying a change graph indicating a change in estimated number of users using the facility on a display apparatus.

5. A crowd condition estimation method for estimating a crowd condition of a facility, the method comprising:
- a detection step of detecting a probe request transmitted from a mobile terminal, the probe request relating to wireless communication;
- a counting step of counting a number of pieces of terminal identification information included in the probe requests detected within a set length of time;
- an estimation step of estimating a number of users using the facility based on the counted number of pieces of terminal identification information and an estimation algorithm for estimating a number of users of a facility; and
- an output step of outputting the estimated number of users using the facility,
- wherein the estimation step of estimating the number of users using the facility is based on a parameter that is at least a parameter relating to a style of the facility, the counted number of pieces of terminal identification information, and the estimation algorithm.

6. A non-transitory recording medium storing a program for causing a computer including a storage section that stores an estimation algorithm for estimating a number of users of a facility, to perform:
- a detection step of detecting a probe request transmitted from a mobile terminal, the probe request relating to wireless communication;
- a counting step of counting a number of pieces of terminal identification information included in the probe requests detected within a set length of time; and
- an estimation step of estimating a number of users using the facility based on the counted number of pieces of terminal identification information and an estimation algorithm for estimating a number of users of a facility,
- wherein the estimation step of estimating the number of users using the facility is based on a parameter that is at least a parameter relating to a style of the facility, the counted number of pieces of terminal identification information, and the estimation algorithm.

7. A crowd condition estimation system for estimating a crowd condition of a facility, the system configured to perform the steps of:
- detecting a probe request transmitted from a mobile terminal, the probe request relating to wireless communication;
- counting a number of pieces of terminal identification information included in the probe requests detected within a set length of time;
- storing a plurality of estimation algorithms for estimating a number of users of a facility;
- selecting any one of the estimation algorithms;
- estimating a number of users using the facility based on the counted number of pieces of terminal identification information and the selected one of the estimation algorithms; and
- outputting the estimated number of users using the facility,
- wherein selecting any one of the estimation algorithms to be used for estimation, according to a type or a value of a parameter that is at least a parameter relating to a style of the facility and a parameter relating to an ambient environment of the facility,
- estimating the number of users using the facility is based on the parameter that is at least the parameter relating to a style of the facility, the counted number of pieces of terminal identification information and the selected one of the estimation algorithms.

* * * * *